(12) United States Patent
Bohn (10) Patent No.: US 8,917,453 B2
(45) Date of Patent: Dec. 23, 2014

(54) REFLECTIVE ARRAY WAVEGUIDE

(75) Inventor: David D. Bohn, Fort Collins, CO (US)

(73) Assignee: Microsoft Corporation, Redmond, WA (US)

( * ) Notice: Subject to any disclaimer, the term of this patent is extended or adjusted under 35 U.S.C. 154(b) by 201 days.

(21) Appl. No.: 13/336,895

(22) Filed: Dec. 23, 2011

(65) Prior Publication Data

US 2013/0163089 A1 Jun. 27, 2013

(51) Int. Cl.
  *G02B 27/14* (2006.01)
  *G02B 27/01* (2006.01)

(52) U.S. Cl.
  CPC .... *G02B 27/0172* (2013.01); *G02B 2027/0178* (2013.01); *G02B 2027/0132* (2013.01)
  USPC ........................................................ 359/630

(58) Field of Classification Search
  USPC ........................................... 359/13, 630, 632
  See application file for complete search history.

(56) References Cited

U.S. PATENT DOCUMENTS

| | | | |
|---|---|---|---|
| 3,971,065 A | 7/1976 | Bayer | |
| 5,309,169 A | 5/1994 | Leppert | |
| 5,359,444 A | 10/1994 | Piosenka et al. | |
| 5,459,611 A | 10/1995 | Bohn et al. | |
| 5,483,307 A | 1/1996 | Anderson | |
| 5,574,473 A | 11/1996 | Sekiguchi | |
| 5,583,609 A | 12/1996 | Mizutani et al. | |
| 5,614,941 A | 3/1997 | Hines | |
| 5,673,146 A | 9/1997 | Kelly | |
| 5,708,449 A | 1/1998 | Heacock et al. | |
| 5,714,967 A | 2/1998 | Okamura et al. | |
| 5,751,476 A | 5/1998 | Matsui et al. | |
| 5,982,553 A | 11/1999 | Bloom et al. | |
| 6,160,667 A | 12/2000 | Smoot | |
| 6,271,808 B1 | 8/2001 | Corbin | |
| 6,377,401 B1 | 4/2002 | Bartlett | |
| 6,529,331 B2 | 3/2003 | Massof et al. | |
| 6,554,428 B2 | 4/2003 | Fergason et al. | |
| 6,577,411 B1 | 6/2003 | David | |

(Continued)

FOREIGN PATENT DOCUMENTS

| | | |
|---|---|---|
| CN | 1440513 | 9/2003 |
| CN | 102004315 | 4/2011 |

(Continued)

OTHER PUBLICATIONS

"Non-Final Office Action", U.S. Appl. No. 13/343,675, (Jul. 16, 2013), 9 pages.

"PCT Search Report and Written", Application No. PCT/US2013/026200, (Jun. 2, 2013), 9 pages.

(Continued)

*Primary Examiner* — Mahidere Sahle (74) *Attorney, Agent, or Firm* — Micah Goldsmith; Judy Yee; Micky Minhas (57) ABSTRACT

In embodiments of reflective array waveguide, a reflective array waveguide includes clear waveguide panels for see-through viewing of an environment viewed through the reflective array waveguide. The reflective array waveguide also includes reflecting waveguide panels to reflect a virtual image that is generated to appear as part of the environment. Each of the reflecting waveguide panels have a partially reflective mirror coating deposited on opposing sides, and the reflecting waveguide panels are alternated in the reflective array waveguide with the clear waveguide panels. The alternating clear and reflecting waveguide panels are angled for augmented reality imaging of the reflected virtual image as part of the environment that is viewed through the reflective array waveguide.

20 Claims, 6 Drawing Sheets

(56) References Cited

U.S. PATENT DOCUMENTS

| | | | |
|---|---|---|---|
| 6,639,201 | B2 | 10/2003 | Almogy et al. |
| 6,753,828 | B2 | 6/2004 | Tuceryan et al. |
| 6,775,460 | B2 | 8/2004 | Steiner et al. |
| 6,829,095 | B2 * | 12/2004 | Amitai ............................ 359/630 |
| 6,867,753 | B2 | 3/2005 | Chinthammit et al. |
| 6,919,867 | B2 | 7/2005 | Sauer |
| 6,947,020 | B2 | 9/2005 | Kiser et al. |
| 6,964,731 | B1 | 11/2005 | Krisko et al. |
| 7,015,876 | B1 | 3/2006 | Miller |
| 7,048,385 | B2 | 5/2006 | Beeson et al. |
| 7,193,584 | B2 | 3/2007 | Lee et al. |
| 7,359,420 | B2 | 4/2008 | Shchegrov et al. |
| 7,369,101 | B2 | 5/2008 | Sauer et al. |
| 7,417,617 | B2 | 8/2008 | Eichenlaub |
| 7,430,349 | B2 | 9/2008 | Jones |
| 7,430,355 | B2 | 9/2008 | Heikenfeld et al. |
| 7,542,665 | B2 | 6/2009 | Lei |
| 7,660,500 | B2 | 2/2010 | Konttinen et al. |
| 7,777,944 | B2 | 8/2010 | Ho et al. |
| 7,986,462 | B2 | 7/2011 | Kobayashi et al. |
| 8,446,340 | B2 | 5/2013 | Aharoni |
| 8,638,498 | B2 | 1/2014 | Bohn |
| 8,666,212 | B1 | 3/2014 | Amirparviz |
| 8,810,600 | B2 | 8/2014 | Bohn et al. |
| 2001/0043208 | A1 | 11/2001 | Furness, III et al. |
| 2003/0006364 | A1 | 1/2003 | Katzir et al. |
| 2004/0085649 | A1 | 5/2004 | Repetto et al. |
| 2004/0135209 | A1 | 7/2004 | Hsieh et al. |
| 2005/0243107 | A1 | 11/2005 | Haim et al. |
| 2006/0018025 | A1 | 1/2006 | Sharon et al. |
| 2006/0054787 | A1 | 3/2006 | Olsen et al. |
| 2006/0072206 | A1 | 4/2006 | Tsuyuki et al. |
| 2006/0249765 | A1 | 11/2006 | Hsieh |
| 2007/0147673 | A1 | 6/2007 | Crandall |
| 2007/0177260 | A1 | 8/2007 | Kuppenheimer et al. |
| 2008/0043100 | A1 | 2/2008 | Sobel et al. |
| 2008/0311386 | A1 | 12/2008 | Wendt |
| 2009/0051283 | A1 | 2/2009 | Cok et al. |
| 2009/0128901 | A1 | 5/2009 | Tilleman et al. |
| 2009/0190003 | A1 | 7/2009 | Park et al. |
| 2010/0060551 | A1 | 3/2010 | Sugiyama et al. |
| 2010/0061078 | A1 | 3/2010 | Kim |
| 2010/0084674 | A1 | 4/2010 | Paetzold et al. |
| 2010/0103078 | A1 | 4/2010 | Mukawa et al. |
| 2010/0141905 | A1 | 6/2010 | Burke |
| 2010/0213467 | A1 | 8/2010 | Lee et al. |
| 2010/0229853 | A1 | 9/2010 | Vandal et al. |
| 2010/0245387 | A1 | 9/2010 | Bachelder et al. |
| 2010/0317132 | A1 | 12/2010 | Rogers et al. |
| 2011/0012814 | A1 | 1/2011 | Tanaka |
| 2011/0032482 | A1 | 2/2011 | Agurok |
| 2011/0050655 | A1 | 3/2011 | Mukawa |
| 2011/0090343 | A1 | 4/2011 | Alt et al. |
| 2011/0091156 | A1 | 4/2011 | Laughlin |
| 2011/0114823 | A1 | 5/2011 | Katzir et al. |
| 2011/0194029 | A1 | 8/2011 | Herrmann et al. |
| 2011/0221659 | A1 | 9/2011 | King et al. |
| 2011/0242145 | A1 | 10/2011 | Nishimura et al. |
| 2011/0242392 | A1 | 10/2011 | Chiang |
| 2011/0248904 | A1 | 10/2011 | Miyawaki et al. |
| 2011/0267799 | A1 | 11/2011 | Epstein et al. |
| 2011/0299044 | A1 | 12/2011 | Yeh et al. |
| 2011/0309378 | A1 | 12/2011 | Lau et al. |
| 2012/0026161 | A1 | 2/2012 | Chen et al. |
| 2012/0106170 | A1 | 5/2012 | Matthews et al. |
| 2012/0113092 | A1 | 5/2012 | Bar-Zeev et al. |
| 2012/0162764 | A1 | 6/2012 | Shimizu |
| 2012/0206589 | A1 | 8/2012 | Crandall |
| 2013/0093741 | A1 | 4/2013 | Akimoto et al. |
| 2013/0162673 | A1 | 6/2013 | Bohn |
| 2013/0170031 | A1 | 7/2013 | Bohn |
| 2013/0187943 | A1 | 7/2013 | Bohn et al. |
| 2013/0207964 | A1 | 8/2013 | Fleck |
| 2013/0208003 | A1 | 8/2013 | Bohn |
| 2013/0208362 | A1 | 8/2013 | Bohn |
| 2013/0208482 | A1 | 8/2013 | Fleck |
| 2013/0342674 | A1 | 12/2013 | Dixon |
| 2014/0078130 | A1 | 3/2014 | Uchino et al. |
| 2014/0104685 | A1 | 4/2014 | Bohn |

FOREIGN PATENT DOCUMENTS

| | | |
|---|---|---|
| JP | 7311303 | 11/1995 |
| JP | 2001078234 | 3/2001 |
| JP | 2008017135 | 1/2008 |
| KR | 20090076539 | 7/2009 |
| WO | WO-9418595 | 8/1994 |
| WO | WO-0195027 | 12/2001 |
| WO | WO-03090611 | 11/2003 |

OTHER PUBLICATIONS

Karp, Jason H., et al., "Planar Micro-optic Solar Concentration using Multiple Imaging Lenses into a Common Slab Waveguide", In Proceedings of SPIE vol. 7407 Available at <http://psilab.ucsd.edu/research/slab_concentration/files/SPIE_Slab_Published.pdf>,(Jan. 2009),11 pages.

"HDTV Helmet Mounted Display", Available at <http://defense-update.com/products/h/HDTV-HMD.htm>,(Jan. 26, 2005),1 page.

Allen, Steven C., "Elixir—Solid-State Luminaire with Enhanced Light Extraction by Internal Reflection", Journal of Display Technology, vol. 3, No. 2, Available at <http://www.naolab.uc.edu/Publications/PDFfiles/355.pdf>,(Jun. 2007), pp. 155-159.

Baluja, Shumeet et al., "Non-Intrusive Gaze Tracking Using Artificial Neural Networks", Technical Report CMU-CS-94-102, Available at <http://citeseerx.ist.psu.edu/viewdoc/download?doi=10.1.1.33.4027&rep=rep1&type=pdf>,(Jan. 5, 1994),14 pages.

Cheng, Yu-Hsiang et al., "Waveguide Displays Based on Polymer-dispersed Liquid Crystals", SPIE Newsroom, Available at <http://spie.org/documents/Newsroom/Imported/003805/003805_10.pdf>,(Aug. 12, 2011),2 pages.

Singh Brar, Rajwinder et al., "Laser-Based Head-Tracked 3D Display Research", Journal of Display Technology, vol. 6, No. 10, Available at <http://ieeexplore.ieee.org/stamp/stamp.jsp?tp=&arnumber=5462999>,(Oct. 2010), pp. 531-543.

"International Search Report and Written Opinion", Application No. PCT/US2012/069330, (Mar. 28, 2013),9 pages.

"PCT Search Report and Written Opinion", Application No. PCT/US2012/069331, (Mar. 29, 2013),10 pages.

"PCT Search Report and Written Opinion", Application No. PCT/US2012/071563, (Apr. 25, 2013),13 pages.

"PCT Search Report and Written Opinion", Application No. PCT/US2013/026200, (Jun. 3, 2013),9 pages.

"Non-Final Office Action", U.S. Appl. No. 13/397,516, Nov. 25, 2013, 10 pages.

"Notice of Allowance", U.S. Appl. No. 13/343,675, Sep. 16, 2013, 8 pages.

"Non-Final Office Action", U.S. Appl. No. 13/397,495, Nov. 13, 2013, 8 pages.

"Final Office Action", U.S. Appl. No. 13/397,495, May 29, 2014, 10 pages.

"Non-Final Office Action", U.S. Appl. No. 13/397,516, Jun. 12, 2014, 11 pages.

"Non-Final Office Action", U.S. Appl. No. 14/134,993, Apr. 17, 2014, 34 pages.

"Notice of Allowance", U.S. Appl. No. 13/356,545, Mar. 28, 2014, 6 pages.

"Final Office Action", U.S. Appl. No. 14/134,993, Aug. 20, 2014, 15 pages.

"Foreign Office Action", CN Application No. 201210567932.5, Aug. 14, 2014, 12 pages.

"Non-Final Office Action", U.S. Appl. No. 13/336,873, Jul. 25, 2014, 16 pages.

"Supplemental Notice of Allowance", U.S. Appl. No. 13/356,545, Jul. 22, 2014, 2 pages.

"Non-Final Office Action", U.S. Appl. No. 13/397,617, Oct. 9, 2014, 6 pages.

* cited by examiner

REFLECTIVE ARRAY WAVEGUIDE

BACKGROUND

Virtual reality can be viewed as a computer-generated simulated environment in which a user has an apparent physical presence. A virtual reality experience can be generated in 3D and viewed with a head-mounted display (HMD), such as glasses or other wearable display device that has near-eye display panels as lenses to display a virtual reality environment, which replaces the actual environment. Augmented reality, however, provides that a user can still see through the display lenses of the glasses or other wearable display device to view the surrounding environment, yet also see images of virtual objects that are generated for display and appear as a part of the environment. Augmented reality can include any type of input such as audio and haptic inputs, as well as virtual images, graphics, and video that enhances or augments the environment that a user experiences. As an emerging technology, there are many challenges and design constraints with augmented reality, from generation of the virtual objects and images so that they appear realistic in a real environment, to developing the optics small and precise enough for implementation with a wearable display device.

A challenge to the implementation of wearable display devices, such as a head-mounted display (HMD), for augmented reality is the manufacture of reflective array waveguides that are utilized as both see-through and reflecting waveguides in the two, independent right and left display lens systems of a wearable display device. Reflective array waveguides include embedded, partially-reflecting mirror panels that are fabricated with a mirror coating applied to one side of each mirror panel, and then the partially-reflecting mirror panels are adhered together to form a waveguide. However, the intense heat that is utilized during the fabrication process to apply the mirror coating, along with the subsequent cooling, can cause warping or a deflection of the mirror panels, which results in a distorted view of a virtual image and/or the surrounding environment when a user looks through the waveguides in the display lens systems of the wearable display device.

SUMMARY

This Summary introduces simplified concepts of reflective array waveguide, and the concepts are further described below in the Detailed Description and/or shown in the Figures. This Summary should not be considered to describe essential features of the claimed subject matter, nor used to determine or limit the scope of the claimed subject matter.

Reflective array waveguide is described. In embodiments, a reflective array waveguide includes clear waveguide panels for see-through viewing of an environment viewed through the reflective array waveguide. The reflective array waveguide also includes reflecting waveguide panels to reflect a virtual image that is generated to appear as part of the environment. Each of the reflecting waveguide panels have a partially reflective mirror coating deposited on opposing sides, and the reflecting waveguide panels are alternated in the reflective array waveguide with the clear waveguide panels. The alternating clear and reflecting waveguide panels are angled for augmented reality imaging of the reflected virtual image as part of the environment that is viewed through the reflective array waveguide.

In other embodiments, the partially reflective mirror coating is a metal oxide coating deposited on opposing sides of a reflecting waveguide panel to balance tensile forces that would otherwise warp the reflecting waveguide panel. The reflecting waveguide panels are each formed from a glass panel with the partially reflective mirror coating deposited on the opposing sides of the glass panel. The clear waveguide panels are each formed as a glass panel positioned between two of the reflecting waveguide panels. Alternatively, the clear waveguide panels are each formed between the reflecting waveguide panels in a plastic injection mold. Each reflecting waveguide panel is bonded on each side to a clear waveguide panel, and each clear waveguide panel is bonded on each side to a reflecting waveguide panel to form an alternating sequence of the clear and reflecting waveguide panels in the reflective array waveguide.

BRIEF DESCRIPTION OF THE DRAWINGS

Embodiments of reflective array waveguide are described with reference to the following Figures. The same numbers may be used throughout to reference like features and components that are shown in the Figures.

DETAILED DESCRIPTION

Embodiments of reflective array waveguide are described. Reflective array waveguides are utilized as see-through and reflecting waveguides in display lens systems of a wearable display device (e.g., glasses or a head-mounted display). As noted above, the partially-reflecting mirror panels of a reflective array waveguide may warp during manufacture, and a deflection of the mirror panels results in a distorted view of the a virtual image and/or the surrounding environment when a user looks through the waveguides of the display lens systems. Embodiments of reflective array waveguide provide techniques to manufacture reflective array waveguides without warping or deflection for use as the left and right display lens systems of a wearable display device, such as for implementations of augmented reality.

A reflective array waveguide includes clear waveguide panels for see-through viewing of an environment and includes reflecting waveguide panels to reflect a virtual image that is generated to appear as part of the environment. Each of the reflecting waveguide panels have a partially reflective mirror coating deposited on opposing sides, which balances the tensile forces that would otherwise warp a reflecting waveguide panel. The reflecting waveguide panels are then alternated in the reflective array waveguide with the clear waveguide panels. The alternating clear and reflecting waveguide panels are angled for augmented reality imaging of the reflected virtual image as part of the environment that is viewed through the reflective array waveguide.

While features and concepts of reflective array waveguide can be implemented in any number of different devices, systems, environments, and/or configurations, embodiments of reflective array waveguide are described in the context of the following example devices, systems, and methods.

Figure 1:
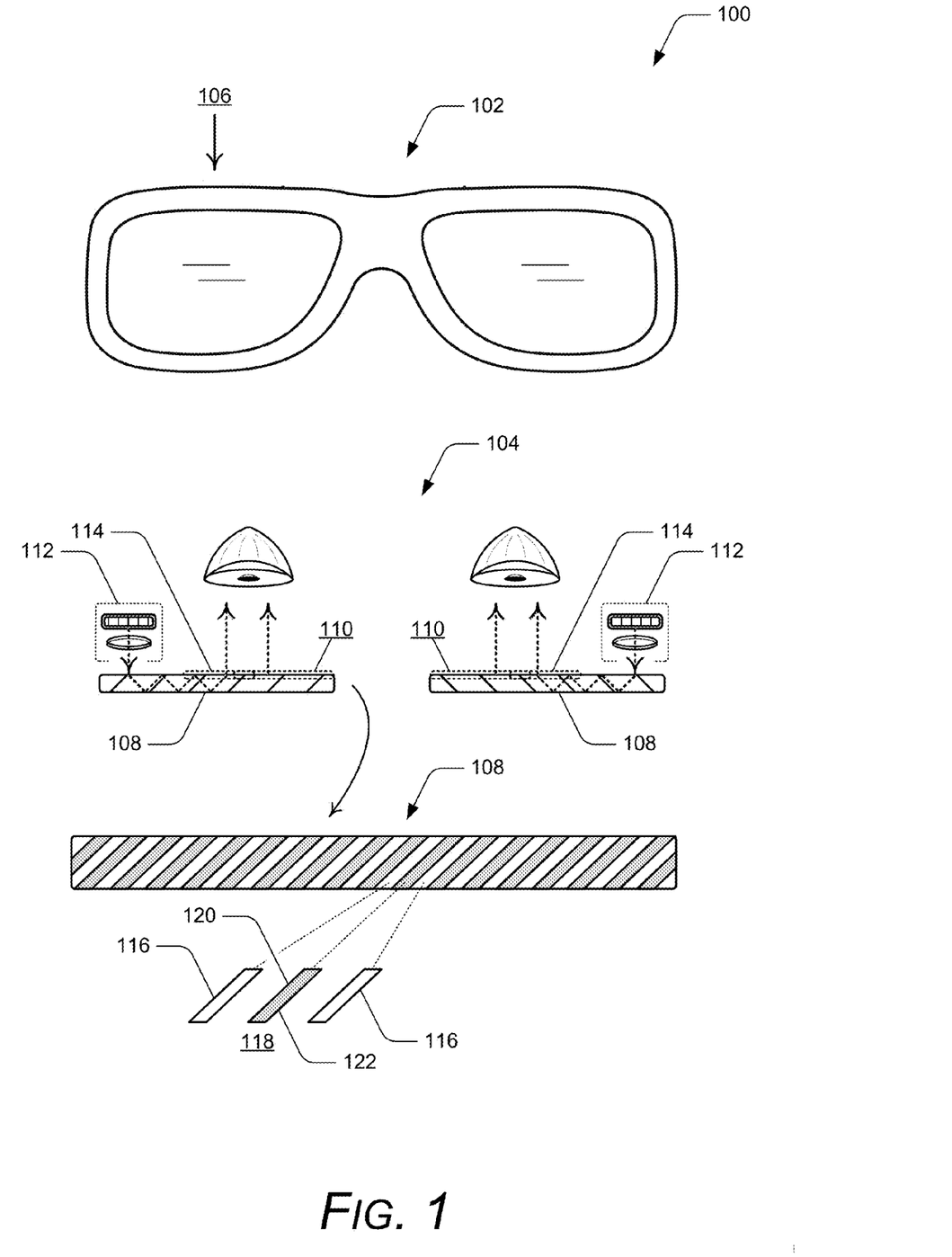
FIG. 1 illustrates an example system in which embodiments of reflective array waveguide can be implemented.

FIG. 1 illustrates an example system 100 in which various embodiments of reflective array waveguide can be implemented. An example wearable display device 102 includes left and right display lens systems, such as display lens systems 104 that are viewed from a perspective 106 of the wearable display device, as if viewing the display lens systems from the top of the device. In embodiments, the display lens systems 104 can be implemented as left and right display lens systems of the wearable display device described with reference to FIG. 4. A wearable display device can be implemented as any type of glasses or head-mounted display (HMD) that includes implementations of the display lens systems 104 (e.g., left and right display lens systems) through which a user can view the surrounding environment, yet also see virtual images that are generated for display and appear as a part of the environment. References to a left imaging system and a right imaging system, as described herein, correlate to a user's left and right eyes (e.g., from the perspective of wearing and looking through the wearable display device). Alternatively, the left and right imaging systems may be described from the perspective of looking at the wearable display device.

The display lens systems 104 each include a reflective array waveguide 108, which is a see-through and reflective display optic through which light of an image 110 (e.g., an image of the environment as viewed through the wearable display device) is projected for viewing. In this example, the display lens systems 104 also include an imaging unit 112, which can be implemented with any number of micro display panels, lenses, and reflecting elements to display and project a virtual image into a reflective array waveguide. The wearable display device 102 and/or a controller unit includes an imaging application, such as a software application, that can be implemented to generate the virtual image for display through the imaging unit 112. Examples of controller units that can implement an imaging application for a wearable display device are described with reference to FIG. 4.

The reflective array waveguide 108 of the respective display lens systems 104 is implemented for internal reflection and conducts visible light of the virtual image from the imaging unit 112 for viewing by a user, and also passes through the light from the surrounding environment for viewing by the user. A display lens system 104 with an imaging unit can also be implemented with components of the display lens system described with reference to FIG. 4 to implement embodiments of reflective array waveguide in a wearable display device.

In embodiments, the reflective array waveguides 108 include clear waveguide panels 116 for see-through viewing of the environment as viewed through a reflective array waveguide. The reflective array waveguides also include reflecting waveguide panels 118 to reflect a virtual image that is generated to appear as part of the environment. The clear waveguide panels can each be formed as a glass panel positioned between two of the reflecting waveguide panels. Each of the reflecting waveguide panels have a partially reflective mirror coating deposited on opposing sides, such as a first side 120 of the reflecting waveguide panel 118 and a second side 122 of the reflecting waveguide panel. The reflecting waveguide panels can each be formed from a glass panel with a multi-layer metal oxide coating deposited on the opposing sides of the panel. The metal oxide coating can be applied with a high temperature as a metal vapor by evaporation deposition, and when the metal oxide coating cools back to ambient temperature, the tensile forces on the opposing sides of the panel that may otherwise warp or deflect the reflecting waveguide panel are balanced. The metal oxide coating can be applied by various coating processes with film deposition technologies that include ion beam sputtering (IBS), ion assisted deposition (IAD), and electron beam (E-beam) evaporative methods.

The reflecting waveguide panels 118 are alternated in the reflective array waveguide 108 with the clear waveguide panels 116. There is no reflective coating applied to the clear waveguide panels that are positioned between the reflecting waveguide panels as glass spacers. Each of the reflecting waveguide panels 118 are bonded on each side to a clear waveguide panel, and the clear waveguide panels are bonded to a reflecting waveguide panel to form an alternating sequence of the clear and reflecting waveguide panels in the reflective array waveguide. The un-warped (e.g., flat, or non-deflected) clear and reflecting waveguide panels form a reflective array waveguide 108 with little or no distortion of the projected virtual image. The alternating clear and reflecting waveguide panels are also angled in the reflective array waveguide for augmented reality imaging of the reflected virtual image as part of the environment that is viewed through the reflective array waveguide.

In an alternate embodiment, the clear waveguide panels 116 of the reflective array waveguide are each formed between the reflecting waveguide panels 118 in a plastic injection mold. The coated reflecting waveguide panels (e.g., that already have the reflecting, multi-layer metal oxide coating applied) can be placed into a plastic injection mold and fixed into place. The coated reflecting waveguide panels may also be preheated prior to placement into the mold and/or may be preheated in the mold (e.g., to match the RI of the plastic and glass as closely as possible, and also to match the CTE of the plastic and glass as closely as possible). The mold is then closed and plastic is injected into the mold, which forms as the clear waveguide panels between the reflecting waveguide panels. After cooling, the fixture is released and removed from the mold, and then trimmed to complete the reflective array waveguide. Anti-reflection or other coatings can optionally be applied to the optical surfaces of the plastic before the reflective array waveguide is included in an optical assembly.

Figure 2:
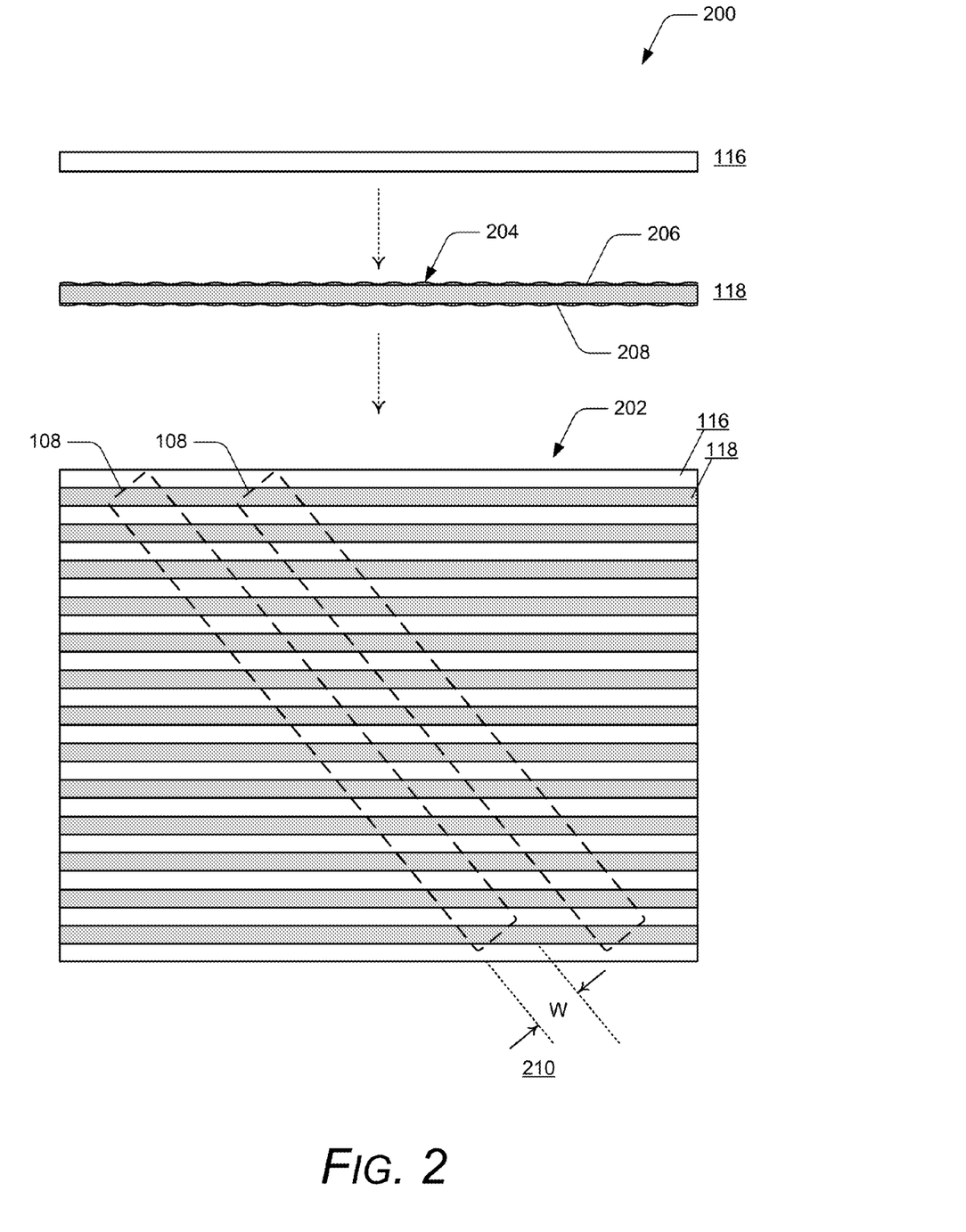
FIG. 2 illustrates an example of clear and reflecting waveguide panels of a reflective array waveguide formed in a stack and bonded together in accordance with one or more embodiments.

FIG. 2 illustrates an example 200 of clear and reflecting waveguide panels that are formed in a stack 202 and bonded together, from which reflective array waveguides can be formed, such as the reflective array waveguides 108 described with reference to FIG. 1. In this example 200, the reflecting waveguide panels 118 are bonded in an alternating sequence to the clear waveguide panels 116. The reflecting waveguide panels 118 are each formed with the partially reflective mirror coating 204 deposited on opposing sides, such as a first side 206 of the reflecting waveguide panel 118 and a second side 208 of the waveguide panel. The stack 202 of the bonded clear and reflecting waveguide panels can then be cross-cut at a selected width 210 to form the reflective array waveguides 108, such as shown in FIG. 1.

Figure 3:
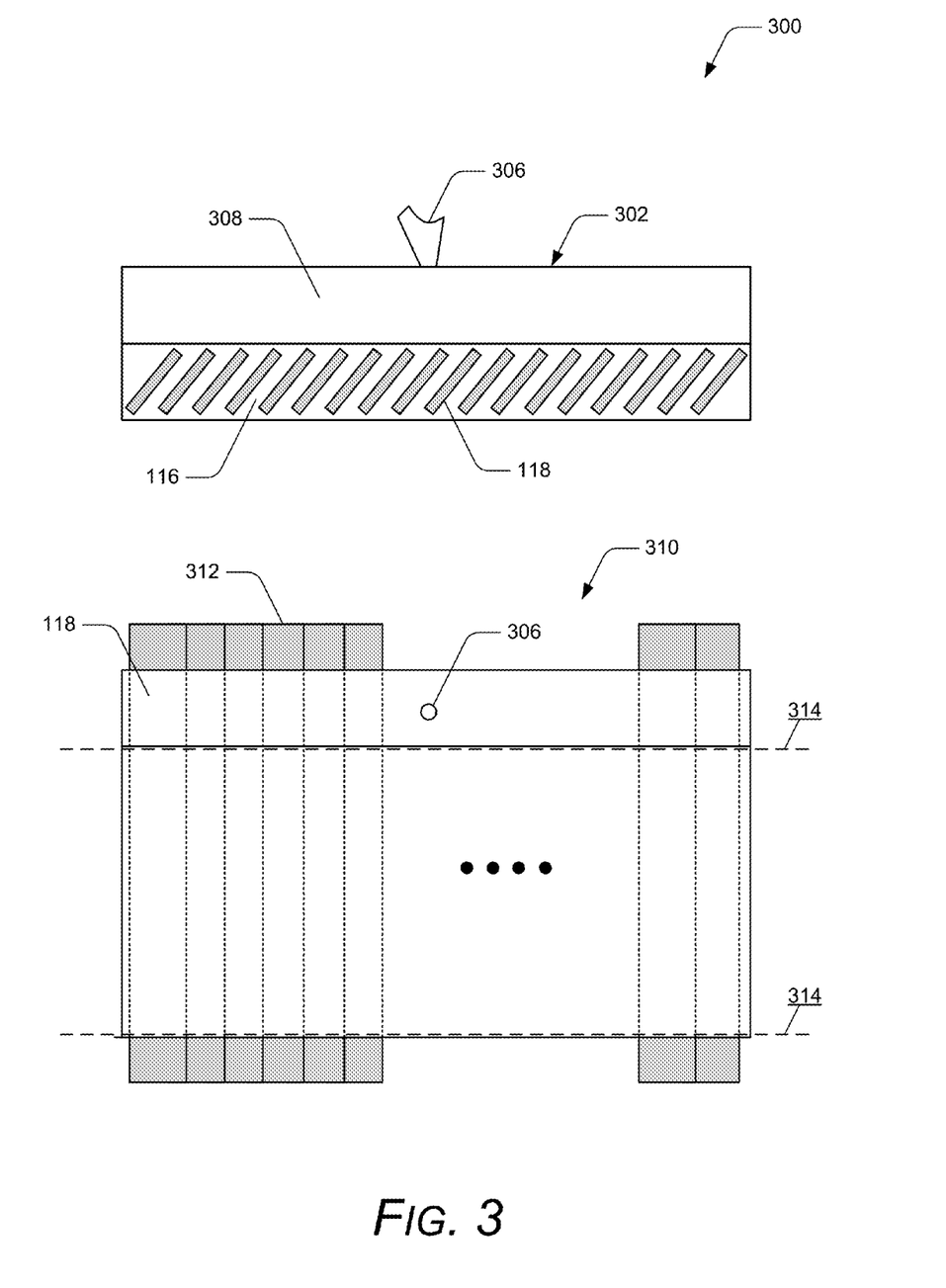
FIG. 3 illustrates an example of clear waveguide panels for a reflective array waveguide formed between reflecting waveguide panels in a plastic injection mold in accordance with one or more embodiments.

FIG. 3 illustrates an example 300 of the clear waveguide panels of a reflective array waveguide formed in a plastic injection mold. The coated reflecting waveguide panels 118 (e.g., that already have the reflecting, multi-layer metal oxide coating applied) are positioned in the plastic injection mold 302 as shown in a side view, and the plastic injection mold includes a molding gate 306 and a molding fan out gate 308.

As shown in a top view 310 of the plastic injection mold, ends 312 of the coated reflecting waveguide panels 118 extend out of the plastic molding area for fixturing in the mold. Plastic is then injected into the mold to form the clear waveguide panels 116 between the reflecting waveguide panels. The molded fixture is then removed from the mold and laser cut as indicated along the trim lines 314 to form a reflective array waveguide 108, such as shown and described with reference to FIG. 1.

Figure 4:
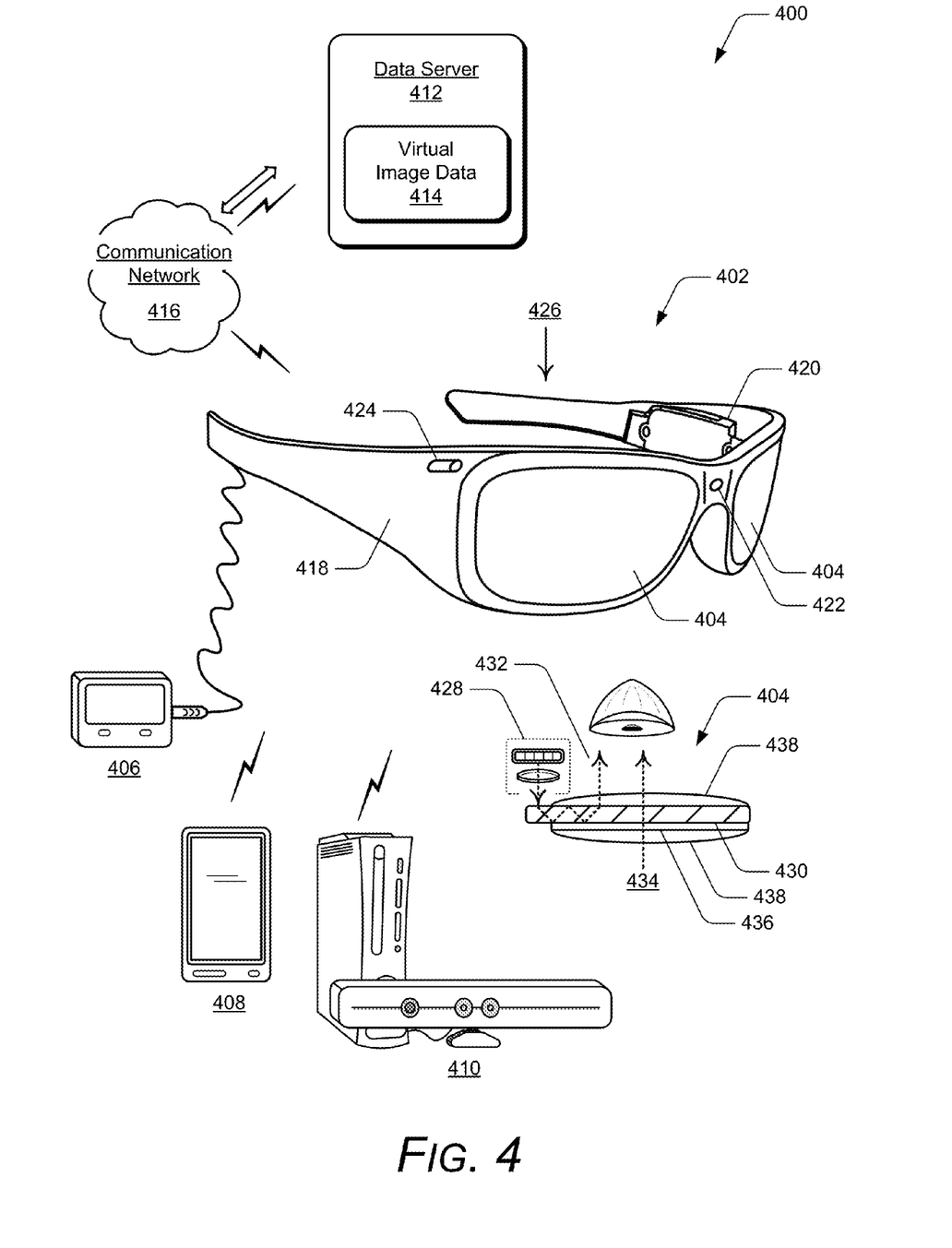
FIG. 4 illustrates an example system that includes an example of a wearable display device in which embodiments of reflective array waveguide can be implemented.

FIG. 4 illustrates an example system 400 that includes an example wearable display device 402 in which embodiments of reflective array waveguide can be implemented. The wearable display device can be implemented as any type of glasses or head-mounted display (HMD) that includes display lens systems 404 (e.g., left and right display lens systems) through which a user can view the surrounding environment, yet also see virtual images (e.g., any type of object, video, text, graphic, and the like) that are generated for display and appear as a part of the environment.

The wearable display device 402 can be implemented as an independent, portable system that includes memory, software, a processor, and/or a power source. Alternatively or in addition, the wearable display device may be communicatively linked to a controller 406 that includes any one or combination of the memory, software, processor, and/or power source, such as a battery unit. The controller can be implemented for wired or wireless communication with the wearable display device. The controller and/or the wearable display device can also be implemented with any number and combination of differing components as further described with reference to the example device shown in FIG. 6. For example, the controller and/or the wearable display device includes an imaging application implemented as computer-executable instructions, such as a software application, and executed by a processor to implement embodiments of reflective array waveguide as described herein.

In embodiments, the controller may be implemented as a dedicated device (e.g., the wired controller 406), as a mobile phone 408, a tablet or other portable computer device, a gaming system 410, or as any other type of electronic device that can be implemented to process and generate virtual images for display as part of the environment that is viewed through the display lens system of the wearable display device. The controller may communicate with the wearable display device wirelessly via WiFi™, Bluetooth™, infrared (IR), RFID transmission, wireless Universal Serial Bus (WUSB), cellular, or via other wireless communication techniques.

The example system 400 also includes a data server 412, or data service, that communicates, or otherwise distributes, virtual image data 414 to the wearable display device 402 via a communication network 416. For example, the data server may be part of a network-based gaming system that generates virtual images for augmented reality display at the wearable display device. Alternatively, the data server may be part of a navigation system that communicates navigation directions and information for display in the display lens systems 404 of the wearable display device. In another example, the data server may be part of a messaging service, such as an e-mail or text messaging system, that communicates e-mail and/or text messages to the wearable display device for display in the display lens systems, where a user can read a message as an augmented reality image that is displayed over the environment viewed through the wearable display device.

Any of the devices, servers, and/or services can communicate via the communication network 416, which may be implemented to include wired and/or wireless networks. The communication network can also be implemented using any type of network topology and/or communication protocol, and can be represented or otherwise implemented as a combination of two or more networks, to include IP-based networks and/or the Internet. The communication network may also include mobile operator networks that are managed by mobile operators, such as a communication service provider, cell-phone provider, and/or Internet service provider.

The wearable display device 402 includes a frame 418, such as in the form of glasses, goggles, or any other structure, that supports and incorporates the various components of the device, as well as serves as a conduit for electrical and other component connections. A components module 420 (or components modules on the left, right, and/or both sides of the device frame) incorporates any of the various components, such as processing and control circuitry, memory, software, a processor, GPS transceiver, and/or power source. The wearable display device may also include a microphone 422 to record audio data from the surrounding environment, as well as ear phones for audio feedback as part of an augmented reality experience.

The wearable display device 402 also includes various cameras 424 that capture video and still images of the surrounding environment. The image and video data can be processed on the device and/or by a controller device (e.g., controller 406), and used to create a mapping field to orient and track a user in the environment space. The wearable display device can also include eye tracking cameras used to determine a user's eyeball location and track eye movements. The wearable display device may also include a temperature sensor, as well as inertial sensors for sensing position, orientation, and acceleration of the wearable display device.

An example of one display lens system 404 is shown from a viewer perspective 426 of the wearable display device 402, as if viewing the display lens system from the top of the device. The display lens system includes an imaging system 428, which can be implemented with any number of micro display panels, lenses, and reflecting elements to display and project a virtual image into a see-through and reflecting waveguide 430. In embodiments, the waveguide 430 can be implemented as a reflective array waveguide, such as shown and described with reference to FIGS. 1 and 2 to implement embodiments of reflective array waveguide. The see-through, reflecting waveguide 430 is implemented for internal reflection and conducts the visible light 432 of a virtual image that is generated by the imaging unit for viewing by a user, and also passes through the light 434 from the surrounding environment for viewing by the user.

The micro display panels, lenses, and/or reflecting elements of the imaging system 428 can be implemented with various display technologies, such as implemented with a transparent LCD, or using a transmissive projection technology where the light source is modulated by optically active material, backlit with white light. These technologies can be implemented using LCD type displays with powerful backlights and high optical energy densities. Alternatively, a micro display and/or reflecting element can be implemented using a reflective technology, such as digital light processing (DLP) and liquid crystal on silicon (LCOS), that reflects external light, which is reflected and modulated by an optical material.

In embodiments, the imaging system 428 (or other components of a display lens system 404) can be implemented to include an infra-red (IR) laser utilized for system calibrations and/or as an illumination source for an eye-tracking system and camera that tracks the position of a user's eyes. The eye-tracking system includes the eye-tracking illumination source, which is not a visible light, and includes an eye-tracking IR sensor. The IR sensor can be implemented as an IR camera that provides infrared image data of the eye for eye-tracking processing, or an IR sensor that detects eye reflections when the eye is illuminated. The see-through and reflecting waveguide 430 can also be utilized for the infrared illumination, and for eyeball reflections that the eye-tracking system uses to track the position of the user's eyes.

In this example, the display lens systems 404 include an optional opacity filter 436, and a see-through lens 438 on each side of the waveguide 430. The see-through lenses can be standard eye-glass lenses and made to prescription (or no prescription). The opacity filter selectively blocks natural light, either uniformly or on a per-pixel basis, from passing through the see-through and reflecting waveguide to enhance the contrast of a displayed virtual image.

Figure 5:
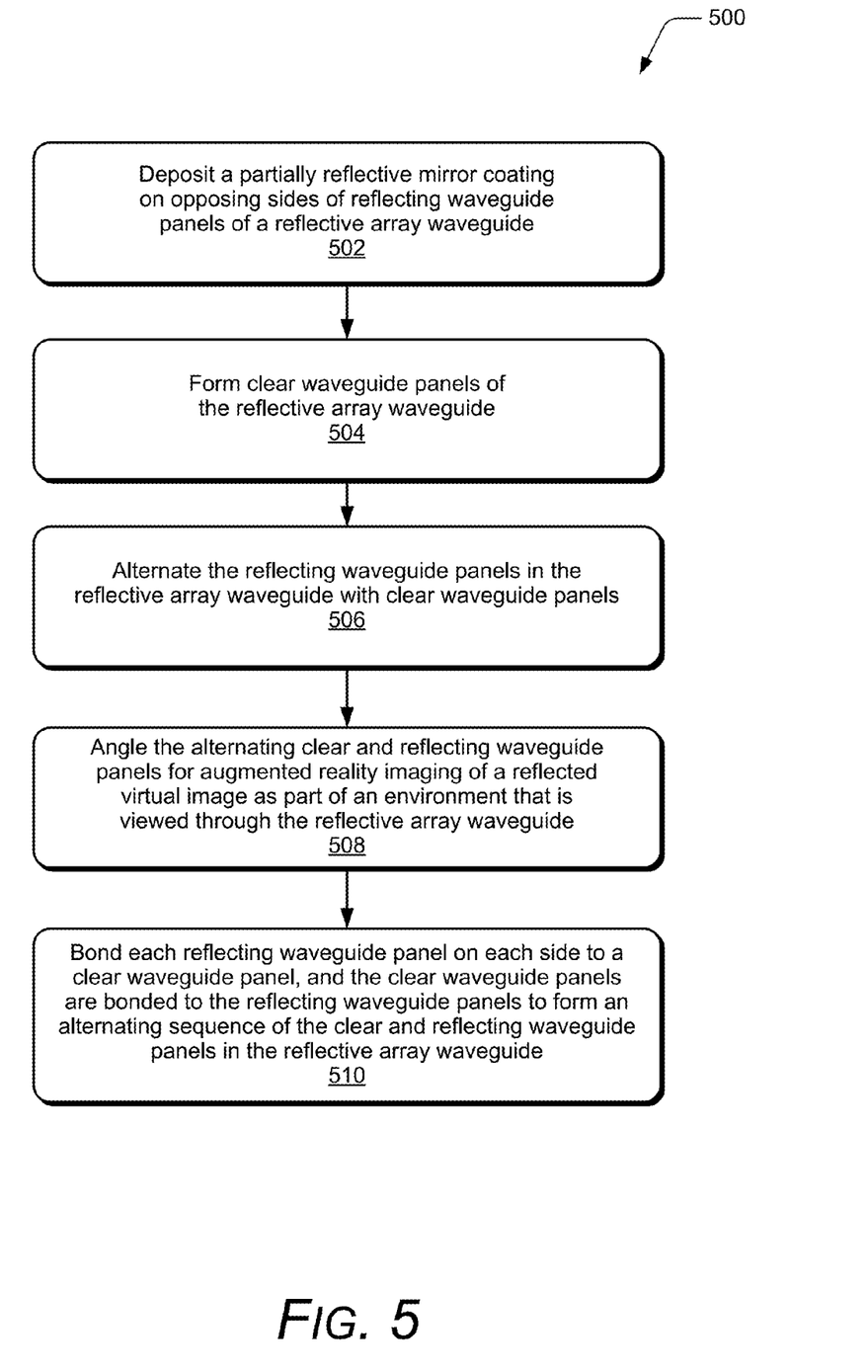
FIG. 5 illustrates example method(s) of reflective array waveguide in accordance with one or more embodiments.

FIG. 5 illustrates example method(s) 500 of reflective array waveguide in accordance with one or more embodiments. The order in which the method blocks are described are not intended to be construed as a limitation, and any number of the described method blocks can be combined in any order to implement a method, or an alternate method.

At block 502, a partially reflective mirror coating is deposited on opposing sides of reflecting waveguide panels of a reflective array waveguide. For example, the reflective array waveguide 108 (FIG. 1) includes the reflecting waveguide panels 118 that have a partially reflective mirror coating 204 (FIG. 2) deposited on opposing sides, such as a first side 206 of the reflecting waveguide panel 118 and a second side 208 of the reflecting waveguide panel. The partially reflective mirror coating can be applied as a metal oxide coating that is deposited on the opposing sides of a reflecting waveguide panel to balance tensile forces that would otherwise warp the reflecting waveguide panel during manufacture.

At block 504, clear waveguide panels of the reflective array waveguide are formed. For example, the reflective array waveguide 108 also includes the clear waveguide panels 116 that are formed as glass panels positioned between two of the reflecting waveguide panels. Alternatively, the clear waveguide panels can be formed in a plastic injection mold as clear plastic between the reflecting waveguide panels. At block 506, the reflecting waveguide panels are alternated in the reflective array waveguide with clear waveguide panels. For example, the reflecting waveguide panels 118 are alternated in a reflective array waveguide 108 with the clear waveguide panels 116.

At block 508, the alternating clear and reflecting waveguide panels are angled for augmented reality imaging of a reflected virtual image as part of an environment that is viewed through the reflective array waveguide. For example, the alternating clear and reflecting waveguide panels are angled in the reflective array waveguides 108 for augmented reality imaging of the reflected virtual image as part of the environment that is viewed through the reflective array waveguide.

At block 510, each reflecting waveguide panel is bonded on each side to a clear waveguide panel, and the clear waveguide panels are bonded to the reflecting waveguide panels to form an alternating sequence of the clear and reflecting waveguide panels in the reflective array waveguide. For example, the reflective array waveguide 108 includes the reflecting waveguide panels 118 that are bonded on each side to a clear waveguide panel 116, and the clear waveguide panels are bonded to a reflecting waveguide panel to form the alternating sequence of the clear and reflecting waveguide panels in the reflective array waveguide.

Figure 6:
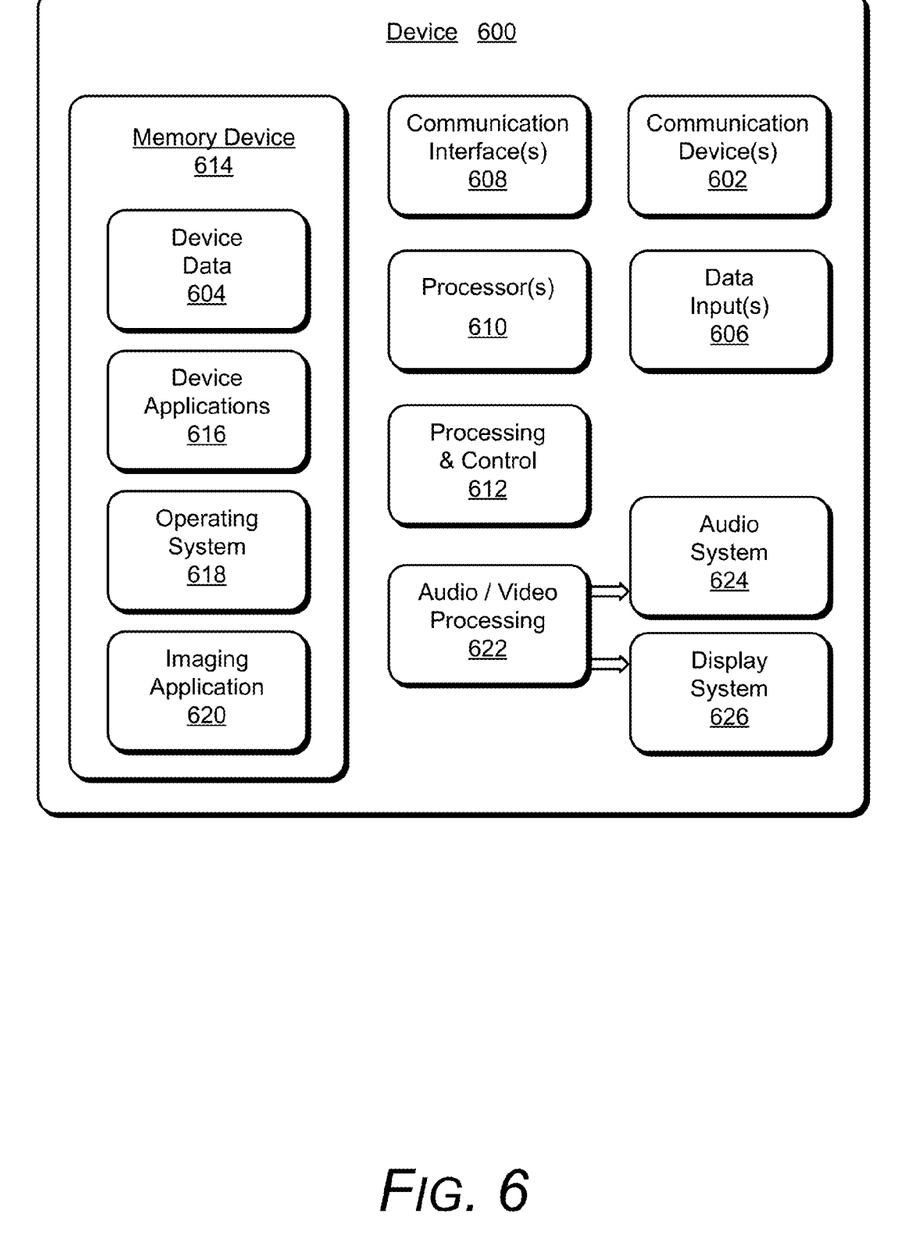
FIG. 6 illustrates various components of an example device that can implement embodiments of reflective array waveguide.

FIG. 6 illustrates various components of an example device 600 that can be implemented as any of the devices described with reference to the previous FIGS. 1-5, such as a wearable display device and/or a controller for a wearable display device. In embodiments, the device may be implemented as any one or combination of a fixed or mobile device, in any form of a consumer, computer, portable, communication, phone, navigation, appliance, gaming, media playback, and/or electronic device. The device may also be associated with a user (i.e., a person) and/or an entity that operates the device such that a device describes logical devices that include users, software, firmware, hardware, and/or a combination of devices.

The device 600 includes communication devices 602 that enable wired and/or wireless communication of device data 604, such as virtual image data, as well as video and images data, and other media content stored on the device. The media content stored on the device can include any type of audio, video, and/or image data. The device includes one or more data inputs 606 via which any type of data, media content, and/or inputs can be received, such as user-selectable inputs and any other type of audio, video, and/or image data received from any content and/or data source.

The device 600 also includes communication interfaces 608, such as any one or more of a serial, parallel, network, or wireless interface. The communication interfaces provide a connection and/or communication links between the device and a communication network by which other electronic, computing, and communication devices communicate data with the device.

The device 600 includes one or more processors 610 (e.g., any of microprocessors, controllers, and the like), which process computer-executable instructions to control the operation of the device. Alternatively or in addition, the device can be implemented with any one or combination of software, hardware, firmware, or fixed logic circuitry that is implemented in connection with processing and control circuits which are generally identified at 612. Although not shown, the device can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

The device 600 also includes one or more memory devices 614 (e.g., computer-readable storage media) that enable data storage, such as random access memory (RAM), non-volatile memory (e.g., read-only memory (ROM), flash memory, etc.), and a disk storage device. A disk storage device may be implemented as any type of magnetic or optical storage device, such as a hard disk drive, a recordable and/or rewriteable disc, and the like. The device may also include a mass storage media device. Computer-readable storage media can be any available medium or media that is accessed by a computing device.

A memory device 614 provides data storage mechanisms to store the device data 604, other types of information and/or data, and device applications 616. For example, an operating system 618 can be maintained as a software application with the memory device and executed on the processors. The device applications may also include a device manager or controller, such as any form of a control application, software application, signal processing and control module, code that is native to a particular device, a hardware abstraction layer for a particular device, and so on. In this example, the device applications also include an imaging application 620.

The device 600 may also include an audio and/or video processing system 622 that generates audio data for an audio system 624 and/or generates display data for a display system 626. In implementations, the audio system and/or the display system are external components to the device. Alternatively, the audio system and/or the display system are integrated components of the example device.

Although embodiments of reflective array waveguide have been described in language specific to features and/or methods, the appended claims are not necessarily limited to the specific features or methods described. Rather, the specific features and methods are disclosed as example implementations of reflective array waveguide.

The invention claimed is:

1. A reflective array waveguide, comprising:
    clear waveguide panels configured for see-through viewing of an environment viewed through the reflective array waveguide; and
    reflecting waveguide panels configured to reflect a virtual image that is generated to appear as part of the environment, each of the reflecting waveguide panels having a partially reflective mirror coating deposited on opposing sides of the reflecting waveguide panels, the reflecting waveguide panels alternated in the reflective array waveguide with the clear waveguide panels, and both the clear and reflecting waveguide panels extending across the reflective array waveguide.

2. A reflective array waveguide as recited in claim 1, wherein the alternating clear and reflecting waveguide panels are angled for augmented reality imaging of the reflected virtual image as part of the environment that is viewed through the reflective array waveguide.

3. A reflective array waveguide as recited in claim 1, wherein the partially reflective mirror coating is a metal oxide coating deposited on the opposing sides of a reflecting waveguide panel to balance tensile forces that would otherwise warp the reflecting waveguide panel.

4. A reflective array waveguide as recited in claim 1, wherein each reflecting waveguide panel is bonded on each side to a clear waveguide panel, and the clear waveguide panels are bonded to the reflecting waveguide panels to form an alternating sequence of the clear and reflecting waveguide panels in the reflective array waveguide.

5. A reflective array waveguide as recited in claim 1, wherein the reflecting waveguide panels are each formed from a glass panel with the partially reflective mirror coating deposited on both sides of the glass panel.

6. A reflective array waveguide as recited in claim 5, wherein the clear waveguide panels are each formed as a glass panel positioned between two of the reflecting waveguide panels.

7. A reflective array waveguide as recited in claim 5, wherein the clear waveguide panels are each formed between the reflecting waveguide panels in a plastic injection mold.

8. A method, comprising:
    depositing a partially reflective mirror coating on opposing sides of reflecting waveguide panels of a reflective array waveguide;
    alternating the reflecting waveguide panels in the reflective array waveguide with clear waveguide panels; and
    bonding each reflecting waveguide panel on each side to a clear waveguide panel, the clear waveguide panels being bonded to the reflecting waveguide panels to form an alternating sequence of the clear and reflecting waveguide panels in the reflective array waveguide, and both the clear and reflecting waveguide panels extending across the reflective array waveguide.

9. A method as recited in claim 8, further comprising angling the alternating clear and reflecting waveguide panels for augmented reality imaging of a reflected virtual image as part of an environment that is viewed through the reflective array waveguide.

10. A method as recited in claim 8, wherein the partially reflective mirror coating is a metal oxide coating deposited on opposite sides of a reflecting waveguide panel to balance tensile forces that would otherwise warp the reflecting waveguide panel.

11. A method as recited in claim 8, further comprising forming each of the reflecting waveguide panels from a glass panel with the partially reflective mirror coating deposited on the opposing sides of the glass panel.

12. A method as recited in claim 11, further comprising forming each of the clear waveguide panels as a glass panel positioned between two of the reflecting waveguide panels.

13. A method as recited in claim 11, further comprising forming each of the clear waveguide panels in a plastic injection mold as a clear plastic panel between two of the reflecting waveguide panels.

14. A wearable display device, comprising:
    a left display lens system configured to form an augmented reality image for viewing, the augmented reality image including a virtual image displayed to appear as part of a viewed environment;
    a right display lens system configured to form the augmented reality image for viewing;
    each of the left and right display lens systems including a reflective array waveguide formed from clear waveguide panels and reflecting waveguide panels;
    the clear waveguide panels configured for see-through viewing of the environment as viewed through the reflective array waveguide; and
    the reflecting waveguide panels configured to reflect the virtual image that is generated to appear as part of the environment, each of the reflecting waveguide panels having a partially reflective mirror coating deposited on opposing sides of the reflecting waveguide panels, the reflecting waveguide panels alternated in the reflective array waveguide with the clear waveguide panels, and both the clear and reflecting waveguide panels extending across the reflective array waveguide.

15. A wearable display device as recited in claim 14, wherein the alternating clear and reflecting waveguide panels are angled for the augmented reality imaging of the reflected virtual image as part of the viewed environment.

16. A wearable display device as recited in claim 14, wherein the partially reflective mirror coating is a metal oxide coating deposited on the opposing sides of a reflecting waveguide panel to balance tensile forces that would otherwise warp the reflecting waveguide panel.

17. A wearable display device as recited in claim 14, wherein each reflecting waveguide panel is bonded on each side to a clear waveguide panel, and the clear waveguide panels are bonded to the reflecting waveguide panels to form an alternating sequence of the clear and reflecting waveguide panels in the reflective array waveguide.

18. A wearable display device as recited in claim 14, wherein the reflecting waveguide panels are each formed from a glass panel with the partially reflective mirror coating deposited on the opposing sides of the glass panel.

19. A wearable display device as recited in claim 18, wherein the clear waveguide panels are each formed as a glass panel positioned between two of the reflecting waveguide panels.

20. A wearable display device as recited in claim 18, wherein the clear waveguide panels are each formed between the reflecting waveguide panels in a plastic injection mold.

* * * * *